US009910229B2

(12) United States Patent
Mori et al.

(10) Patent No.: US 9,910,229 B2
(45) Date of Patent: Mar. 6, 2018

(54) OPTICAL MODULE AND OPTICAL-MODULE-EQUIPPED CABLE

(71) Applicant: FUJIKURA LTD., Koto-ku, Tokyo (JP)

(72) Inventors: Masao Mori, Chiba (JP); Yu Takahashi, Chiba (JP); Susumu Okabe, Chiba (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 15/375,804

(22) Filed: Dec. 12, 2016

(65) Prior Publication Data
US 2017/0090128 A1 Mar. 30, 2017

Related U.S. Application Data

(63) Continuation of application No. PCT/JP2015/063888, filed on May 14, 2015.

(30) Foreign Application Priority Data

Jun. 13, 2014 (JP) ................................. 2014-122277

(51) Int. Cl.
*G02B 6/38* (2006.01)
*G02B 6/42* (2006.01)

(52) U.S. Cl.
CPC ........... *G02B 6/3893* (2013.01); *G02B 6/387* (2013.01); *G02B 6/3881* (2013.01);
(Continued)

(58) Field of Classification Search
None
See application file for complete search history.

(56) References Cited

U.S. PATENT DOCUMENTS 8,506,172 B2 * 8/2013 Meadowcroft ...... G02B 6/4261
385/147
2011/0081114 A1 * 4/2011 Togami ................ G02B 6/4246
385/76
(Continued)

FOREIGN PATENT DOCUMENTS

JP 2009-86595 A 4/2009
JP 2013-11890 A 1/2013
(Continued)

OTHER PUBLICATIONS

"Product Information: Active Optical Cable, 56 Gbit/s QSFP-AOC", Fujikura Ltd., http://www.fujikura.co.jp/products/tele/o#active/td140021.html. Accessed May 29, 2014.
"AT-DC2552XS", (https://www.allied-telesis.co.jp/support/list/switch/dc2552xs/rel/doc/m001578a.pdf).
"Cisco 7600 Series Ethernet Services 20G Line Card Hardware Installation Guide", http://www.cisco.com/c/en/us/td/docs/routers/7600/Hardware/Module_and_Line_Card_Installation_Guides/ES20_Line_Card_Installation_Guide/es20-install-guide.pdf.
International Search Report for PCT/JP2015/063888 dated Jul. 21, 2015.
(Continued)

*Primary Examiner* — Chad H Smith
(74) *Attorney, Agent, or Firm* — Sughrue Mion, PLLC

(57) ABSTRACT

Disclosed is an optical module configured to be provided to an end part of an optical cable. The optical module includes: a housing wherein, when the optical module side as viewed from the optical cable is defined as the front side and the opposite side therefrom is defined as the rear side, a front-side section of the housing is configured to be inserted into a cage, and a boot for protecting the optical cable extends from the rear side of the housing; a latch-releasing part attached slidably in the front/rear direction to the housing, the latch-releasing part having a projection for releasing a latched state established by a catch on the cage; a tab for pulling the latch-releasing part toward the rear to cause the projection to release the latched state established by the catch on the cage; and a push part that is to be pressed by an operator until the latched state is established, the push part having a rear end surface located more toward the rear than the boot.

7 Claims, 13 Drawing Sheets

(52) U.S. Cl.
CPC ......... *G02B 6/3887* (2013.01); *G02B 6/4274* (2013.01); *G02B 6/4292* (2013.01)

(56) References Cited

U.S. PATENT DOCUMENTS

| | | | |
|---|---|---|---|
| 2011/0268390 A1* | 11/2011 | Yi | ........................ G02B 6/4201 385/50 |
| 2012/0251049 A1 | 10/2012 | Meadowcroft et al. | |
| 2013/0004127 A1 | 1/2013 | McColloch | |
| 2014/0064675 A1 | 3/2014 | Tanaka et al. | |
| 2014/0179143 A1 | 6/2014 | Kappla et al. | |
| 2014/0219616 A1 | 8/2014 | Ishii et al. | |
| 2014/0328561 A1 | 11/2014 | Tanaka et al. | |
| 2016/0004022 A1 | 1/2016 | Ishii et al. | |

FOREIGN PATENT DOCUMENTS

| | | |
|---|---|---|
| JP | 2013-134347 A | 7/2013 |
| JP | 2015-121587 A | 7/2015 |
| WO | 2013/030093 A2 | 3/2013 |

OTHER PUBLICATIONS

International Preliminary Report on Patentability issued from the International Bureau in counterpart International Application No. PCT/JP2015/063888, dated Dec. 22, 2016.

\* cited by examiner

OPTICAL MODULE AND OPTICAL-MODULE-EQUIPPED CABLE

TECHNICAL FIELD

The disclosure relates to an optical module and an optical-module-equipped cable.

BACKGROUND ART

Active optical cables having, on respective ends thereof, optical modules (optical transceiver modules) for mutually converting electric signals and optical signals are employed in the field of high-speed optical communications. For example, standardized pluggable optical modules, such as SFP and QSFP modules, are used for the optical modules.

When an optical module is inserted into a cage provided in a communication device (on the host side), a connection terminal within the optical module is connected electrically and mechanically to an electric connector within the cage. Thereby, optical signals transmitted/received by an optical cable can be converted into electric signals processed in the communication device, and vice versa, by photoelectric conversion elements and circuit substrates within the optical module.

There are cases where the insertion opening of a cage of a communication device is located at a position far inward from the communication device's front panel surface in order to prevent an optical module, when inserted into the cage, from projecting out from the front panel surface. In such cases, it may be difficult to insert an optical module into the cage.

CITATION LIST

Patent Literature

Patent Literature 1: JP 2013-134347A

Non Patent Literature

Non Patent Literature 1: "Product Information: Active Optical Cable, 56 Gbit/s QSFP-AOC", Fujikura Ltd., http://www.fujikura.co.jp/products/tele/o#active/td140021.html. Accessed May 29, 2014.

SUMMARY OF DISCLOSURE

An objective of some embodiments of the invention is to provide an optical module that is easy to insert into a cage, even when the insertion opening of the cage is located at a far inward position.

An aspect of the invention is an optical module configured to be provided to an end part of an optical cable, the optical module including: a housing wherein, when the optical module side as viewed from the optical cable is defined as the front side and the opposite side therefrom is defined as the rear side, a section of the housing on the front side is configured to be inserted into a cage, and a boot for protecting the optical cable extends from the rear side of the housing; a latch-releasing part attached slidably in the front/rear direction to the housing, the latch-releasing part having a projection for releasing a latched state established by a catch on the cage; a tab for pulling the latch-releasing part toward the rear to cause the projection to release the latched state established by the catch on the cage; and a push part that is to be pressed by an operator until the latched state is established, the push part having a rear end surface located more toward the rear than the boot.

Other features are disclosed in the following description and the accompanying drawings.

BRIEF DESCRIPTION OF DRAWINGS

FIG. 3A is a diagram illustrating the latched state, and FIG. 3B is a diagram illustrating a state where the latched state is released.

DESCRIPTION OF EMBODIMENTS

Figure 1:
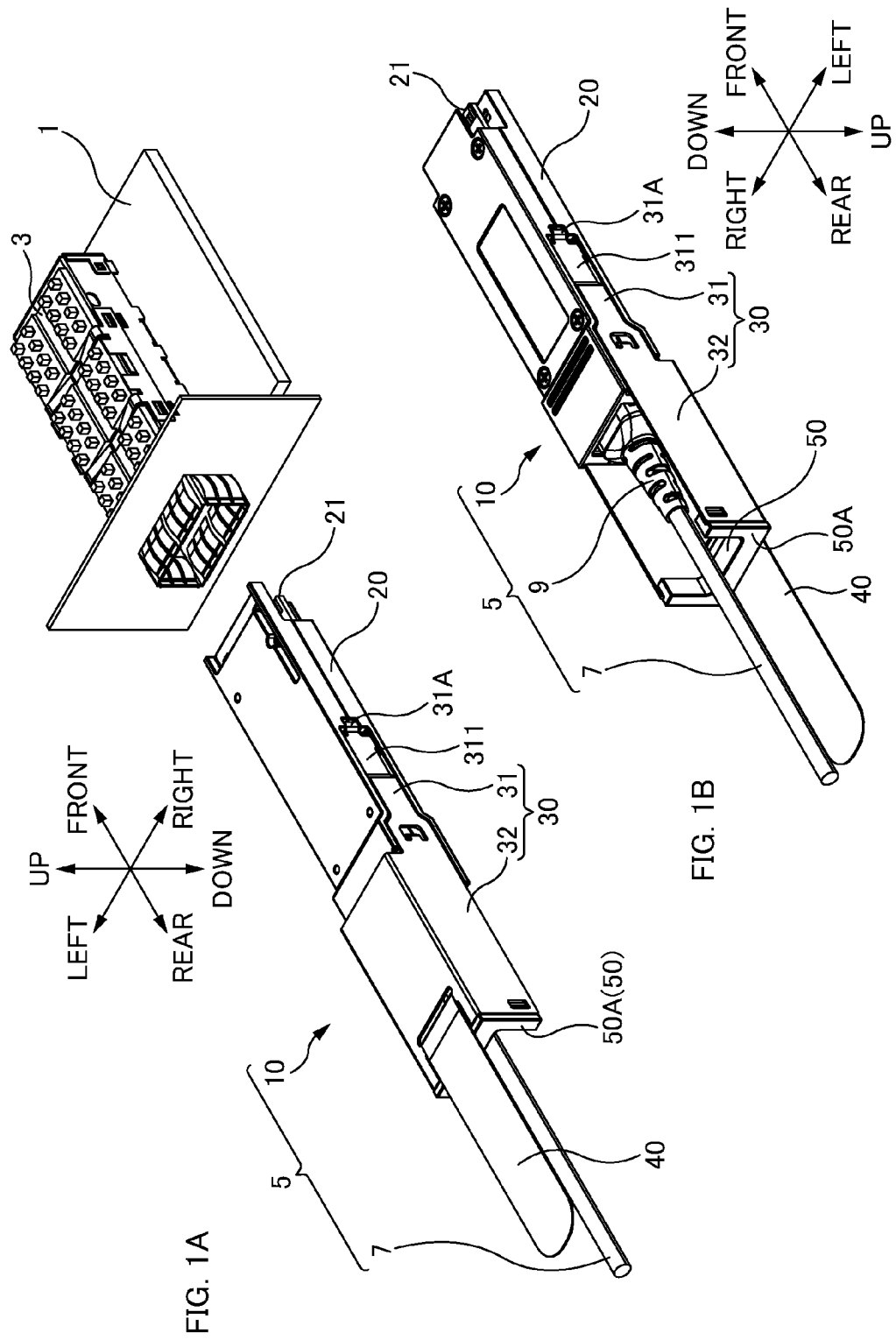
FIGS. 1A and 1B are diagrams illustrating an optical module 10 of a first embodiment.

At least the following matters are disclosed in the following description and the drawings.

Disclosed is an optical module configured to be provided to an end part of an optical cable, the optical module including: a housing wherein, when the optical module side as viewed from the optical cable is defined as the front side and the opposite side therefrom is defined as the rear side, a section of the housing on the front side is configured to be inserted into a cage, and a boot for protecting the optical cable extends from the rear side of the housing; a latch-releasing part attached slidably in the front/rear direction to the housing, the latch-releasing part having a projection for releasing a latched state established by a catch on the cage; a tab for pulling the latch-releasing part toward the rear to cause the projection to release the latched state established by the catch on the cage; and a push part that is to be pressed by an operator until the latched state is established, the push part having a rear end surface located more toward the rear than the boot.

This optical module can be inserted easily into a cage, even when the insertion opening of the cage is located at a far inward position.

Preferably, the push part is provided to the latch-releasing part. With this configuration, a slight clearance (play) is provided between the latch-releasing part and the housing. By providing this clearance, it is possible to reduce the force applied to the connection terminal within the optical module and the electric connector within the cage and thus suppress/prevent the connection terminal and the electric connector from being damaged.

Preferably, the tab is attached rotatably to a rotary shaft provided to the latch-releasing part. In this way, the tab does not get in the way when an operator presses the push part with his/her fingertip.

Preferably, the rotary shaft is located more toward the front than the rear end surface of the push part. In this way, the tab does not get in the way when an operator presses the push part with his/her fingertip.

Preferably, the push part has a section that presses a rear edge of the latch-releasing part from the rear side. In this way, the push part is less likely to fall off from the latch-releasing part when the push part is pressed.

Preferably, the push part is a U-shaped component having an open section, and is attached to the latch-releasing part by arranging the open section on the opposite side from the tab. Usually, there is often more empty space on the tab side of the optical module. So, by arranging the push part's open section on the opposite side from the tab, at least a portion of the push part's rear end surface is arranged on the tab side, thus making it easier for an operator to press the push part's rear end surface (the rear end surface's region on the tab side) with his/her fingertip.

Also disclosed is an optical-module-equipped cable including: an optical cable; and an optical module provided to an end part of the optical cable. When the optical-module side as viewed from the optical cable is defined as the front side and the opposite side therefrom is defined as the rear side, the optical module includes: a housing, wherein a section of the housing on the front side is configured to be inserted into a cage, and a boot for protecting the optical cable extends from the rear side of the housing; a latch-releasing part attached slidably in the front/rear direction to the housing, the latch-releasing part having a projection for releasing a latched state established by a catch on the cage; a tab for pulling the latch-releasing part toward the rear to cause the projection to release the latched state established by the catch on the cage; and a push part that is to be pressed by an operator until the latched state is established, the push part having a rear end surface located more toward the rear than the boot.

This optical-module-equipped cable facilitates the task of inserting an optical module into a cage, even when the insertion opening of the cage is located at a far inward position.

First Embodiment

Optical Module 10' of Reference Example

Figure 12:
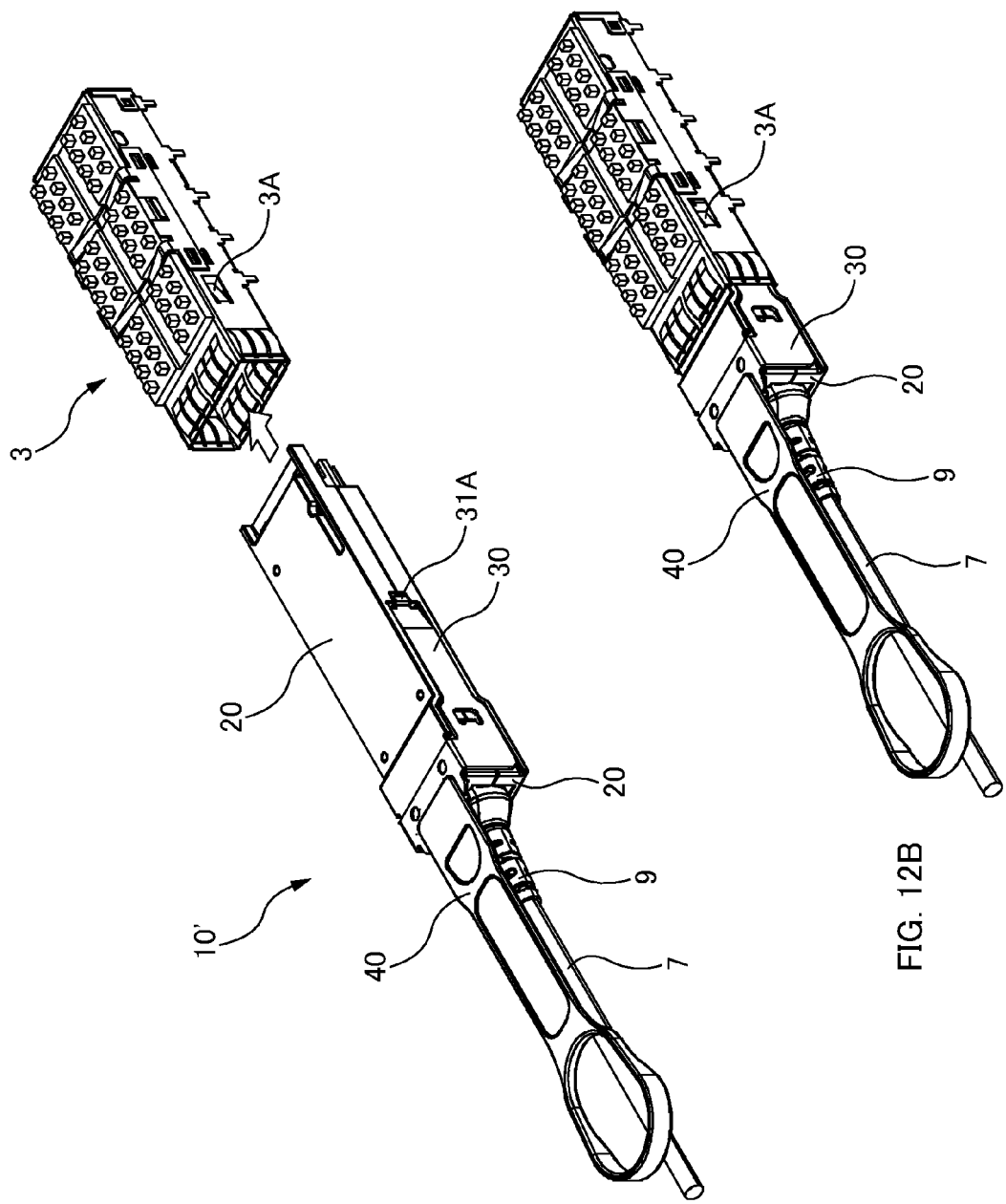
FIGS. 12A and 12B are diagrams illustrating an optical module 10' of a reference example.

Before describing the optical module 10 of the present embodiment, we will describe an optical module 10' of a reference example. FIGS. 12A and 12B are diagrams illustrating an optical module 10' of a reference example.

The optical module 10' of the reference example includes a housing 20, a latch-releasing part 30, and a tab 40. The latch-releasing part 30 has a projection 31A for releasing a latched state established by a catch 3A on a cage 3. When the optical module 10' is inserted into the cage 3, the catch 3A on the cage 3 catches against the optical module 10', and the cage 3 latches onto the optical module 10'. In the following description, a state where the catch 3A of the cage 3 is engaged with the optical module 10' (i.e., a state where the cage 3 latches onto the optical module) is referred to as a "latched state".

At the time of removing the optical module 10' from the cage 3, an operator pulls the tab 40. Thereby, the latch-releasing part 30 slides with respect to the housing 20, and the projection 31A of the latch-releasing part 30 releases the latched state established by the catch 3A of the cage 3.

Figure 13:
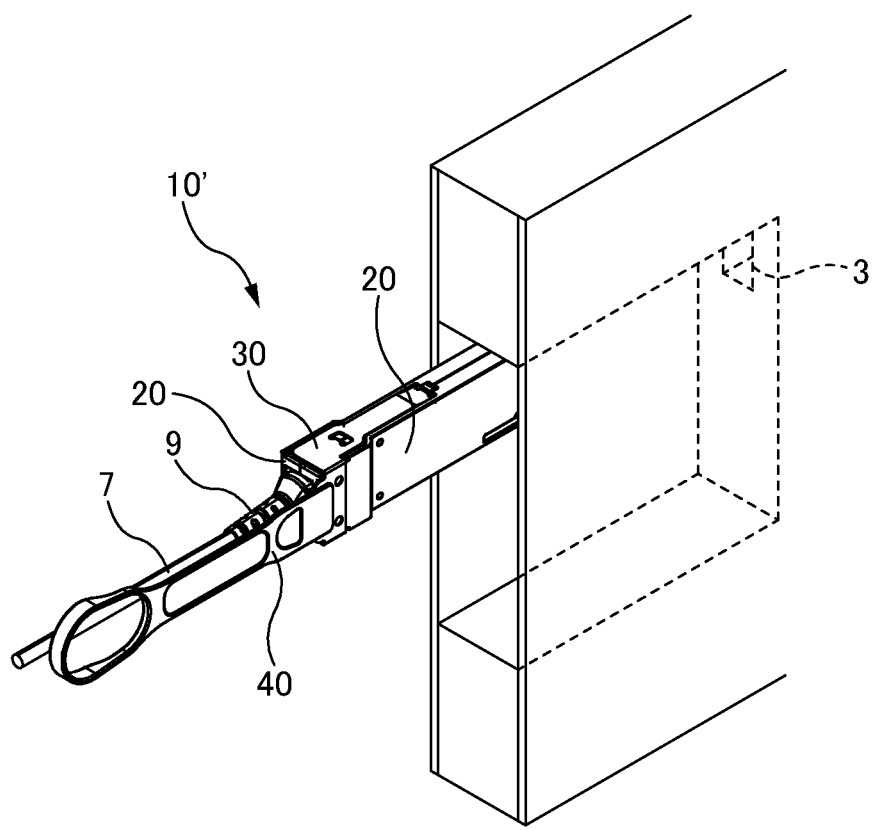
FIG. 13 is a diagram illustrating how the optical module 10' of the reference example is inserted into a cage 3 located at a far inward position.

FIG. 13 is a diagram illustrating how the optical module 10' of the reference example is inserted into a cage 3 located at a far inward position.

There are cases where the insertion opening of a cage 3 of a communication device is located at a position far inward from the communication device's front panel surface in order to prevent an optical module, when inserted into the cage 3, from projecting out from the front panel surface. In such cases, it is difficult for an operator to insert the optical module into the cage 3 by holding the lateral surfaces of the optical module (i.e., by pinching the optical module with two fingers); thus, the operator will need to press the rear end surface of the optical module with his/her fingertip to insert the optical module into the cage 3. The tab 40 is made of a flexible resin, so it is difficult to insert the optical module to the latched state by pressing the tab 40.

When the optical module 10' of the reference example is to be inserted into a cage 3 located at a far inward position, the operator will press the rear end surface of the housing 20 with his/her fingertip. In cases where the operator's finger cannot reach a position that achieves the latched state, the operator will need to press the optical module 10' by using a tool or a rod, thus making the task of inserting the optical module 10' into the cage inconvenient.

Further, a boot 9 and an optical cable 7 extend from the rear end surface of the housing 20, and thus, the rear end surface of the housing 20 only has a very small area outside the boot 9, making it difficult for the operator to press the rear end surface of the housing 20 with his/her fingertip. Moreover, the optical cable 7 may get bent when the operator attempts to press the rear end surface of the housing 20—where there is only a very small area outside the boot 9—with his/her fingertip.

As described above, it is difficult to insert the optical module 10' of the reference example into a cage 3 in cases where the insertion opening of the cage 3 is located at a far inward position.

Figure 2:
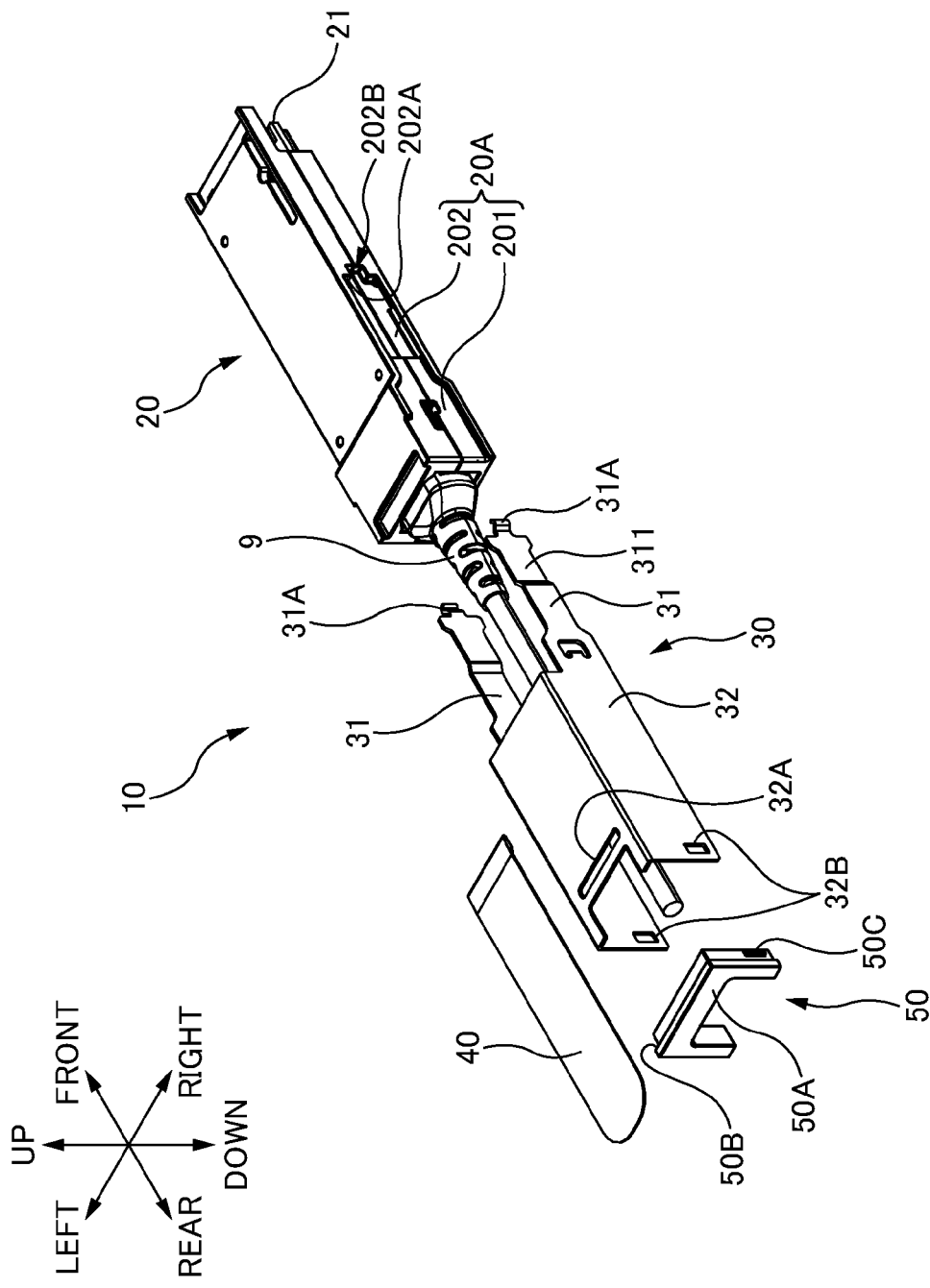
FIG. 2 is an exploded view of the optical module 10 of the first embodiment.
Figure 3A:
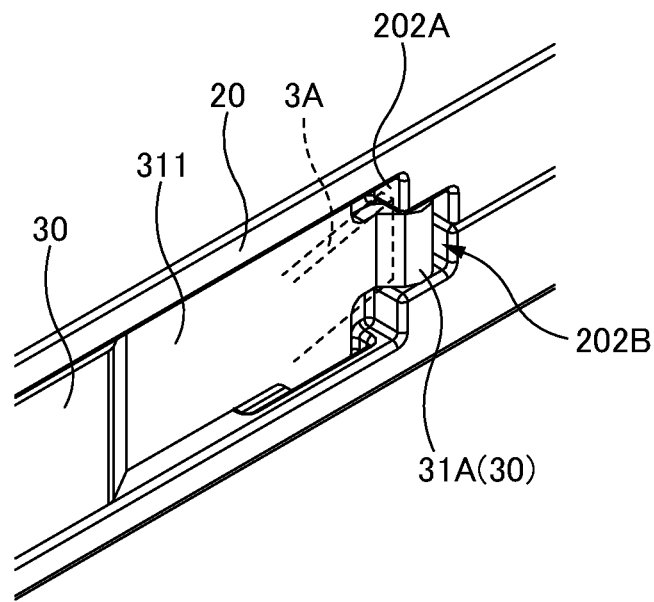
FIGS. 3A and 3B are enlarged diagrams illustrating the vicinity of a projection 31A of the optical module 10.
Figure 3B:
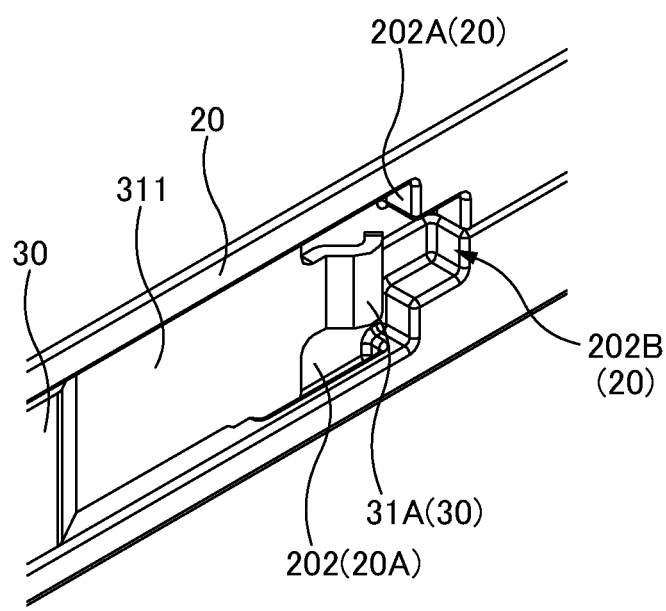

Optical Module 10 of First Embodiment:

FIGS. 1A and 1B are diagrams illustrating an optical module 10 of a first embodiment. FIG. 1A is a perspective view as viewed from the upper side, and FIG. 1B is a perspective view as viewed from the lower side. FIG. 2 is an exploded view of the optical module 10 of the first embodiment. FIGS. 3A and 3B are enlarged diagrams illustrating the vicinity of a projection 31A of the optical module 10. FIG. 3A is a diagram illustrating the latched state, and FIG. 3B is a diagram illustrating a state where the latched state is released.

In the description below, as illustrated in FIG. 1A, the direction perpendicular to a main substrate 1 provided with a cage 3 is referred to as the "up/down direction", wherein the side provided with the cage 3 as viewed from the main substrate 1 is referred to as "up" and the opposite side therefrom is referred to as "down". The direction in which the optical module 10 is inserted/removed is referred to as the "front/rear direction", wherein the side toward the optical module 10 as viewed from an optical cable 7 is referred to as "front" and the opposite side therefrom is referred to as "rear". The direction perpendicular to the up/down direction and the front/rear direction is referred to as the "left/right direction", wherein the right-hand side as viewed from rear to front is referred to as "right" and the opposite side therefrom is referred to as "left".

An active optical cable 5 is an optical-module-equipped cable having optical modules 10 provided to both ends of an optical cable 7. The optical module 10 is configured as a pluggable optical module capable of mutually converting electric signals and optical signals. The optical module 10 includes a housing 20, a latch-releasing part 30, a tab 40, and a push part 50.

The housing 20 is a casing wherein a section thereof on the front side is configured to be inserted into a cage 3, and a boot 9 for protecting the optical cable 7 extends from the rear side of the housing 20. The housing 20 houses a printed-circuit board 21 on which photoelectric conversion elements (not illustrated) and electric circuits (not illustrated) are mounted. The housing 20 has a shape compliant with the standard for, for example, a QSFP-type optical module 10. The printed-circuit board 21 is exposed from the front side of the housing 20, and a connection terminal (card-edge connector) to be connected to an electric connector within the cage 3 is formed on the front-side end part of the printed-circuit board 21.

The latch-releasing part 30 is attached slidably to the rear side of the housing 20. A guide groove 20A (cf. FIG. 2) that guides the latch-releasing part 30 in the front/rear direction is formed in each of the left and right lateral surfaces of the housing 20.

Each guide groove 20A includes a slide surface 201 and a recess 202. The slide surface 201 is a surface on which the latch-releasing part 30 slides. The recess 202 is formed more toward the front than the slide surface 201, and is a section that is recessed more inward than the slide surface 201. A wall part 202A and an accommodation part 202B are formed at the front end of the recess 202. The wall part 202A is a section that engages with (or catches against) an end part of the catch 3A on the cage 3 (cf. FIGS. 12A and 12B). Stated differently, the catch 3A of the cage 3 engages with the wall part 202A of the optical module 10, and thereby, the cage 3 latches onto the optical module 10. Thus, the wall part 202A of the optical module 10 and the catch 3A of the cage 3 constitute a latch mechanism. The accommodation part 202B is an indentation formed more toward the front than the wall part 202A, and is a section that houses a projection 31A of the latch-releasing part 30.

The latch-releasing part 30 is attached slidably in the front/rear direction to the housing 20, and has a projection 31A for releasing a latched state established by the catch 3A on the cage 3. The latch-releasing part 30 has, for example, a shape compliant with the standard for a QSFP-type optical module 10. When the latch-releasing part 30 is pulled toward the rear, the latch-releasing part 30 slides toward the rear with respect to the housing 20, and the projection 31A of the latch-releasing part 30 releases the latched state established by the catch 3A of the cage 3. More specifically, the projection 31A of the latch-releasing part 30 presses the catch 3A of the cage 3 outward, to release the latched state. As described above, the latch-releasing part 30 is a member that releases the latched state of the optical module 10.

The latch-releasing part 30 includes a pair of lateral surface plates 31, and a U-shaped part 32.

The lateral surface plates 31 are plate-shaped sections formed so as to extend frontward from the respective left and right lateral surfaces of the U-shaped part 32. The lateral surface plates 31 are arranged in the respective guide grooves 20A of the housing 20, and thereby, the latch-releasing part 30 is guided slidably in the front/rear direction with respect to the housing 20.

A depressed part 311 is formed on the front side of each lateral surface plate 31. The depressed part 311 is a section depressed inward on the front side of the lateral surface plate 31, and is arranged such that it can slide into the recess 202 of the housing 20. The projection 31A is formed on the front side of the depressed part 311.

The projection 31A is a section for releasing a latched state established by the catch 3A on the cage 3. In this example, the projection 31A presses the catch 3A of the cage 3 outward to thereby release the latched state established by the catch 3A of the cage 3. The projection 31A is a section projecting outward from each lateral surface plate 31 (more specifically, from the depressed part 311 of each lateral surface plate 31). When the optical module 10 is inserted into the cage 3 and a latched state is established, the projection 31A is located more toward the front than the catch 3A of the cage 3 and is accommodated in the accommodation part 202B of the housing 20, as illustrated in FIG. 3A. When the latch-releasing part 30 is pulled toward the rear, the latch-releasing part 30 slides toward the rear with respect to the housing 20, and, when the projection 31A moves toward the rear from the accommodation part 202B, the projection 31A outwardly presses the catch 3A of the cage 3 which is engaged with the wall part 202A (i.e., spreads the catch 3A outward), to release the latched state, as illustrated in FIG. 3B.

The U-shaped part 32 is a section on the rear side of the latch-releasing part 30, and is a section whose cross-sectional shape perpendicular to the front/rear direction is U-shaped. The latch-releasing part 30 is formed by bending a metal sheet, and the U-shaped part 32 is also constituted by a bent metal sheet.

Figure 5:
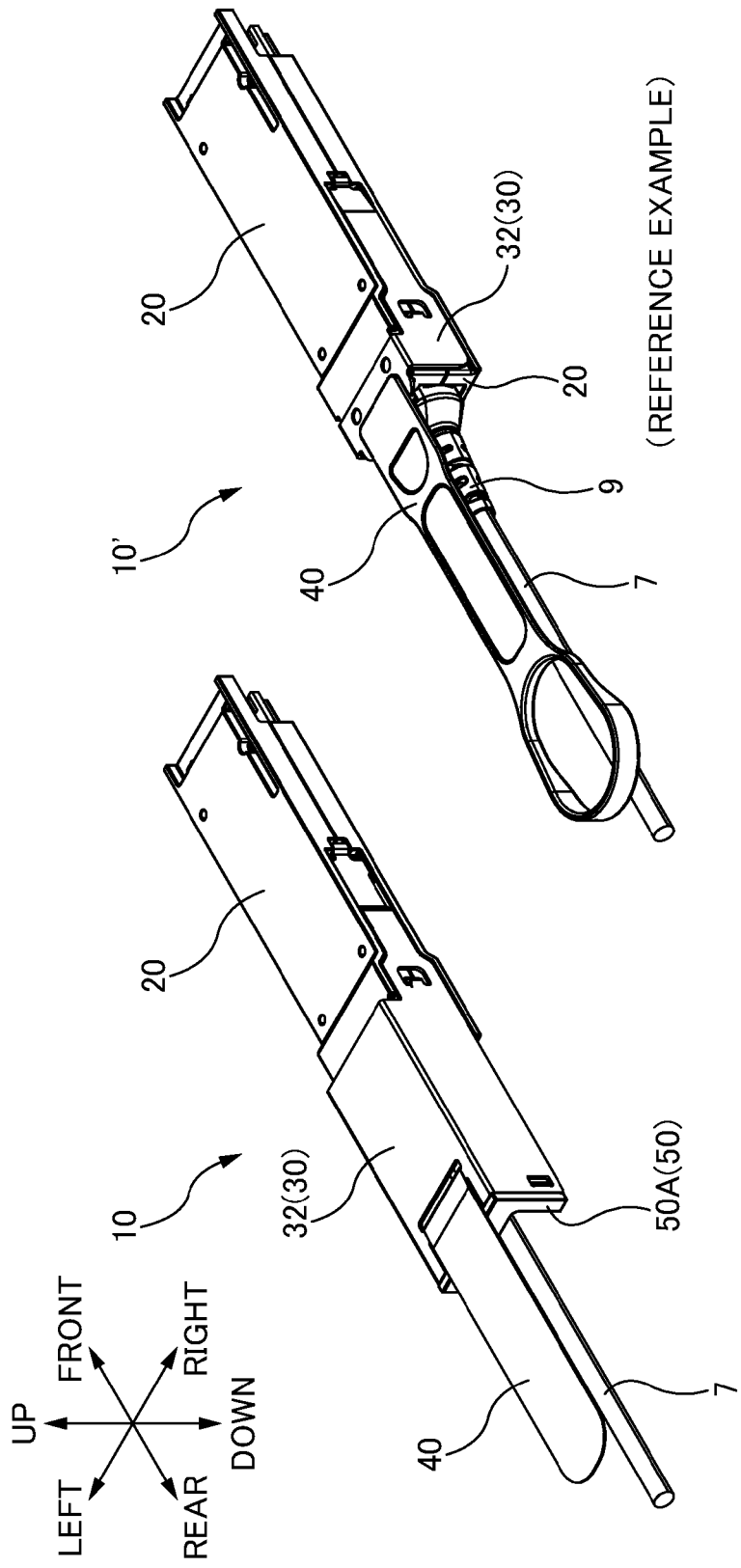
FIG. 5 is a perspective view for comparing the optical module 10 of the first embodiment and an optical module 10' of a reference example.

FIG. 5 is a perspective view for comparing the optical module 10 of the first embodiment and an optical module 10' of a reference example. In the aforementioned reference example, the latch-releasing part 30 does not project rearward from the housing 20. In contrast, in the present embodiment, the U-shaped part 32 of the latch-releasing part 30 projects more toward the rear than the housing 20. The present embodiment is configured in this way to arrange the push part 50 more toward the rear than the boot 9. In the present embodiment, the U-shaped part 32 projects more toward the rear than the housing 20 such that the rear end part of the U-shaped part 32 is located more toward the rear than the boot 9. Note, however, that the rear end part of the U-shaped part 32 may be located more toward the front than the boot 9, so long as the rear end surface 50A of the push part 50 is located more toward the rear than the boot 9.

A rotary shaft 32A for rotatably attaching the tab 40 is formed on the upper surface of the U-shaped part 32. The rotary shaft 32A is formed more toward the front side than the rear end part of the U-shaped part 32. In this way, the rotary shaft 32A is located more toward the front than the rear end surface 50A of the push part 50, and thus, when an operator presses the rear end surface 50A of the push part 50 with his/her fingertip, the tab 40 does not get in the way, even when a section on the tab 40 side (i.e., a section on the upper side of the optical cable 7) is pressed. A section on the rear side of the rotary shaft 32A is void of sheet metal and is left open in order to arrange the tab 40 therein. If the rotary shaft 32A is formed on the front side of the U-shaped part 32, a large space will be opened on the rear side on the upper surface of the U-shaped part 32 (i.e., there will be a large section lacking sheet metal), and the U-shaped part 32 will be reduced in strength. So, it is preferable to provide the rotary shaft 32A on the rear side of the U-shaped part 32.

Attachment parts 32B for attaching the push part 50 are formed in the respective left and right lateral surfaces of the U-shaped part 32. In this example, the attachment parts 32B are through holes penetrating the metal sheet. The push part 50 is attached to the U-shaped part 32 by fitting protrusions 50C of the push part 50 respectively into the attachment parts 32B. Preferably, the attachment parts 32B are arranged more toward the rear than the boot 9. In this way, the rear end surface 50A of the push part 50 attached to the attachment parts 32B will be located more toward the rear than the boot 9.

Figure 4:
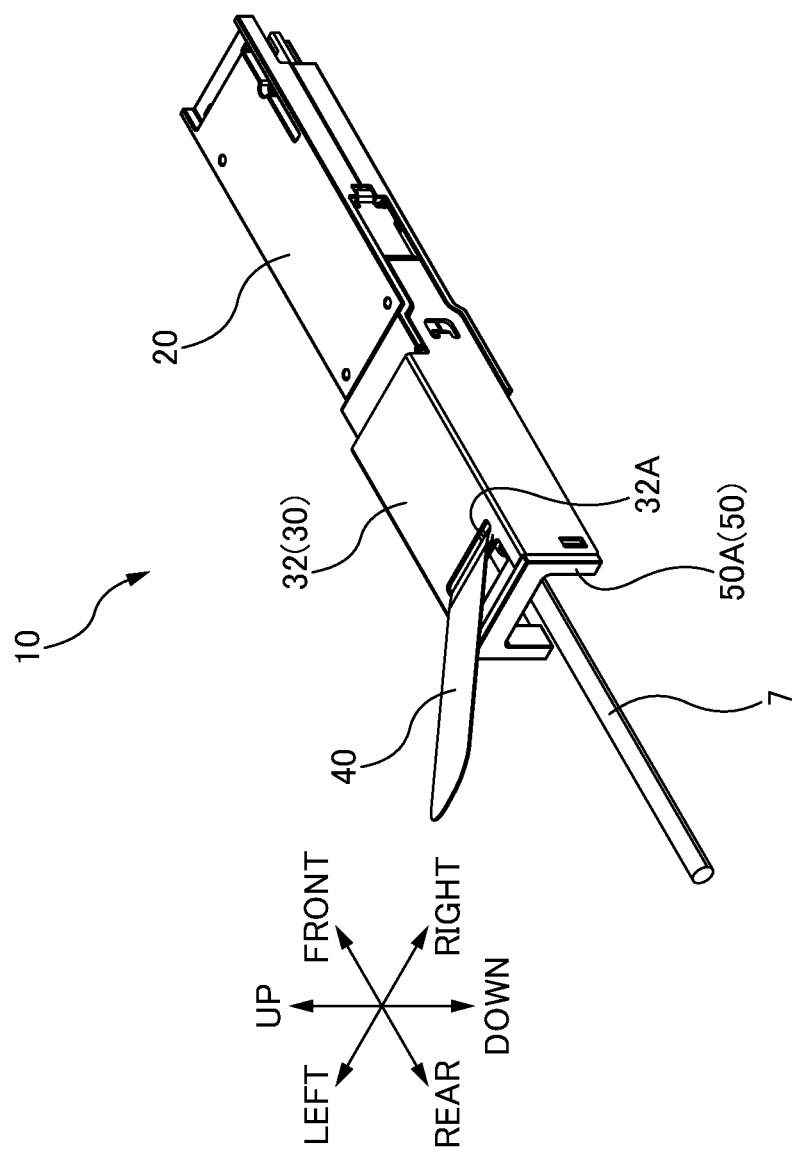
FIG. 4 is a diagram illustrating a state where a tab 40 of the optical module 10 is rotated.

The tab 40 is a member for pulling the latch-releasing part 30 toward the rear to release the latched state. The tab 40 is made of resin, which is a flexible material, but it may be made of cloth, for example. By making the tab 40 out of a flexible and lightweight material, the tab 40 does not get in the way when an operator presses the rear end surface 50A of the push part 50 with his/her fingertip, even when a section on the tab 40 side (i.e., a section on the upper side of the optical cable 7) is pressed. The tab 40 is attached to the latch-releasing part 30 to pull the latch-releasing part 30 toward the rear. Further, as illustrated in FIG. 4, the tab 40 is attached rotatably to the rotary shaft 32A of the latch-releasing part 30.

The push part 50 is a member that is to be pressed by an operator until a latched state is established. The rear end surface 50A of the push part 50 constitutes a region that is pressed by the operator's fingertip. The push part 50 is a U-shaped component, and has an open section. Thus, the push part 50 can be attached even in a state where the optical cable 7 is already present. (If the push part 50 is ring-shaped (i.e., has no open section), the push part 50 cannot be attached in a state where the optical cable 7 is present.)

In the present embodiment, the U-shaped push part 50 is attached to the latch-releasing part 30 in an inverted U-shaped configuration by arranging the open section on the lower side (i.e., on the opposite side from the tab 40). In this way, at least a portion of the rear end surface 50A of the push part 50 is arranged on the upper side (i.e., on the tab 40 side), and thereby, when an operator presses the rear end surface 50A of the push part 50 with his/her fingertip, he/she can press the upper part of the rear end surface 50A. Usually, there is often more empty space on the upper side of the cage 3 (or the upper side of the optical module 10, or the side with the tab 40) than the lower side. Thus, by arranging the open section of the U-shaped push part 50 on the lower side (i.e., on the opposite side from the tab 40) and attaching the push part 50 to the latch-releasing part 30 in an inverted U-shaped configuration, an operator can press the rear end surface 50A of the push part 50 (the upper part of the rear end surface 50A in this example) with his/her fingertip with ease.

The rear end surface 50A of the push part 50 is located more toward the rear than the boot 9. This configuration facilitates the task of inserting the optical module 10 into a cage 3 located at a far inward position. This is described in detail.

Figure 6A:
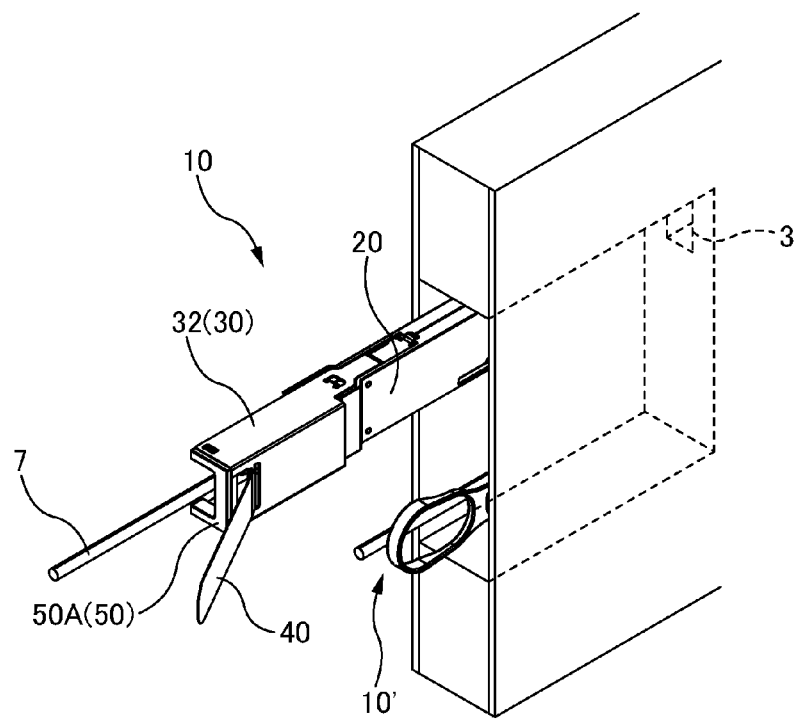
FIG. 6A is a diagram illustrating how the optical module 10 of the first embodiment is inserted into a cage 3 located at a far inward position.
Figure 6B:
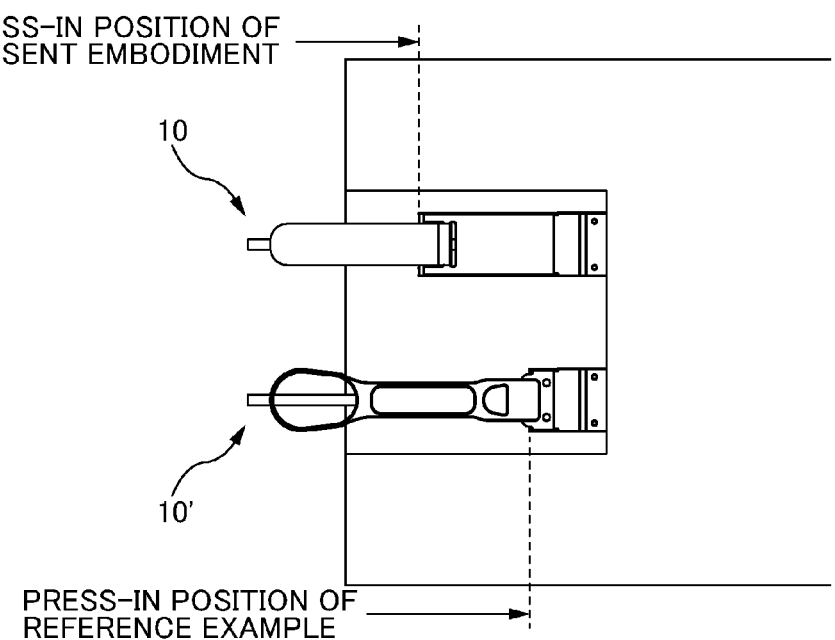
FIG. 6B is a diagram comparing press-in positions until the latched state is established.

FIG. 6A is a diagram illustrating how the optical module 10 of the first embodiment is inserted into a cage 3 located at a far inward position. FIG. 6B is a diagram comparing press-in positions until the latched state is established.

When inserting the optical module 10 of the present embodiment into a cage 3 arranged at a far inward position, an operator will press the rear end surface 50A of the push part 50 with his/her fingertip. The rear end surface 50A of the push part 50 is located more toward the rear than the boot 9; so, the press-in position until the latched state is established is more toward the rear compared to the press-in position of the reference example (cf. FIG. 6B). Thus, with the optical module 10 of the present embodiment, when the optical module 10 is pressed to achieve the latched state, it is less likely that the operator's finger will not reach the press-in position, thus facilitating the task of insertion into the cage 3.

Further, by locating the rear end surface 50A of the push part 50 more toward the rear than the boot 9, it is possible to broaden the width of the rear end surface 50A and widen the area thereof. This is described in detail. In the optical module 10' of the reference example illustrated in FIG. 13, the area outside the boot 9—which has a large cross-sectional area—is small, and thus, it is difficult for an operator to press the rear end surface of the housing 20 with his/her fingertip. In contrast, in the optical module 10 of the present embodiment, the rear end surface 50A of the push part 50 can be arranged outside the optical cable 7—which has a smaller cross-sectional area than the boot 9—and thus, it is possible to broaden the width of the rear end surface 50A and also widen the area of the rear end surface 50A. Thus, the operator can press the rear end surface 50A of the push part 50 easily.

In the optical module 10' of the reference example, an operator presses the rear end surface of the housing 20 with his/her fingertip. Thus, the operator's pressing force is applied directly to the housing 20. This may result in undue force being applied to the connection terminal of the optical module 10' and/or the electric connector within the cage 3, and may cause damage to the connection terminal of the optical module 10' and/or the electric connector within the cage 3. Particularly, the housing 20, which is oblong in the front/rear direction, causes leverage, and the force pressing the rear end surface of the housing 20 tends to damage the connection terminal and/or the electric connector located on the front side of the housing 20.

In contrast, in the optical module 10 of the present embodiment, the push part 50 is provided to the latch-releasing part 30. Thus, the operator's pressing force is transmitted indirectly to the housing 20 via the latch-releasing part 30. The latch-releasing part 30 is provided slidably with respect to the housing 20, and a slight clearance (play) is provided between the latch-releasing part 30 and the housing 20. By providing this clearance, it is possible to reduce the force applied to the connection terminal within the optical module 10 and the electric connector within the cage 3 and thus suppress/prevent the connection terminal and the electric connector from being damaged.

Further, in the optical module 10 of the present embodiment, the left and right lateral surfaces constituting the U-shaped part 32 slightly deform in the left/right direction when force is applied thereto. Thus, the left/right direction component of force applied to the connection terminal of the optical module 10 and the electric connector within the cage 3 can be further reduced by the amount of deformation of the U-shaped part 32.

Moreover, in the optical module 10 of the present embodiment, the tab 40 is attached rotatably to the rotary shaft 32A formed on the latch-releasing part 30, as illustrated in FIG. 4. In this way, the tab 40 does not get in the way when an operator presses the push part 50 with his/her fingertip, as illustrated in FIG. 6A.

Figure 7:
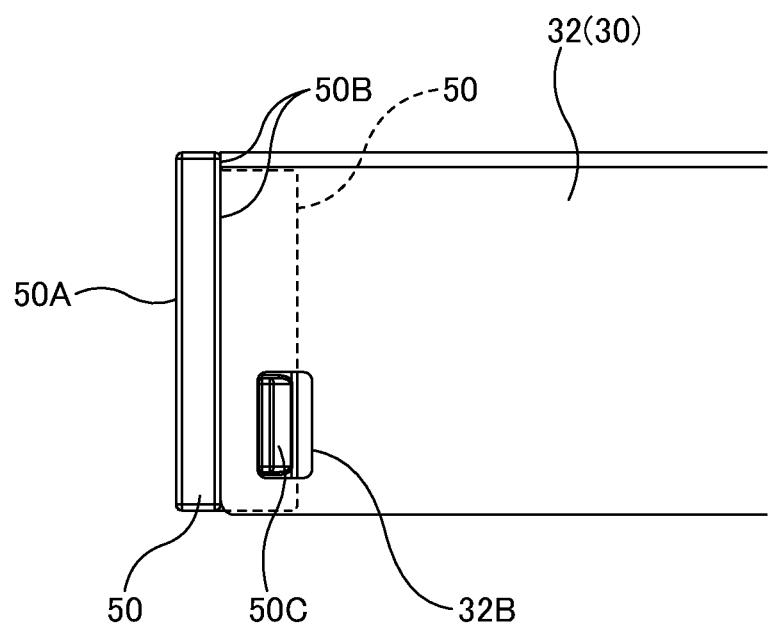
FIG. 7 is an enlarged view of the vicinity of a push part 50 and the rear edge of a latch-releasing part 30.

FIG. 7 is an enlarged view of the vicinity of the push part 50 and the rear edge of the latch-releasing part 30. As illustrated in the figure, the front-side section of the push part 50 is arranged inside the U-shaped part 32 of the latch-releasing part 30, whereas the outer periphery of the rear-side section of the push part 50 projects more outward than the front-side section, thereby forming a step part 50B on the lateral surfaces of the push part 50. This step part 50B is arranged along the rear edge of the latch-releasing part 30 (i.e., the rear edge of the U-shaped part 32); when the rear end surface 50A of the push part 50 is pressed, the rear edge of the latch-releasing part 30 will be pressed by the step part 50B. The step part 50B constitutes a section that presses the rear edge of the latch-releasing part 30 from the rear side, and thus, the push part 50 is constructed so as to press the rear edge of the latch-releasing part 30 from the rear. Thus, the push part 50 is less likely to fall off from the latch-releasing part 30 when the push part 50 is pressed.

Second Embodiment

Figure 8A:
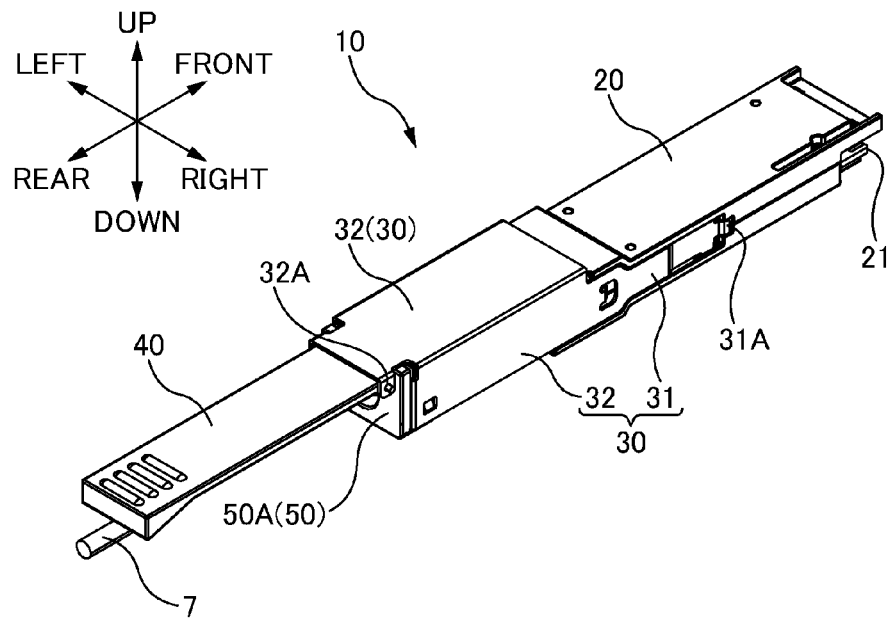
FIGS. 8A and 8B are diagrams illustrating an optical module 10 of a second embodiment.
Figure 8B:
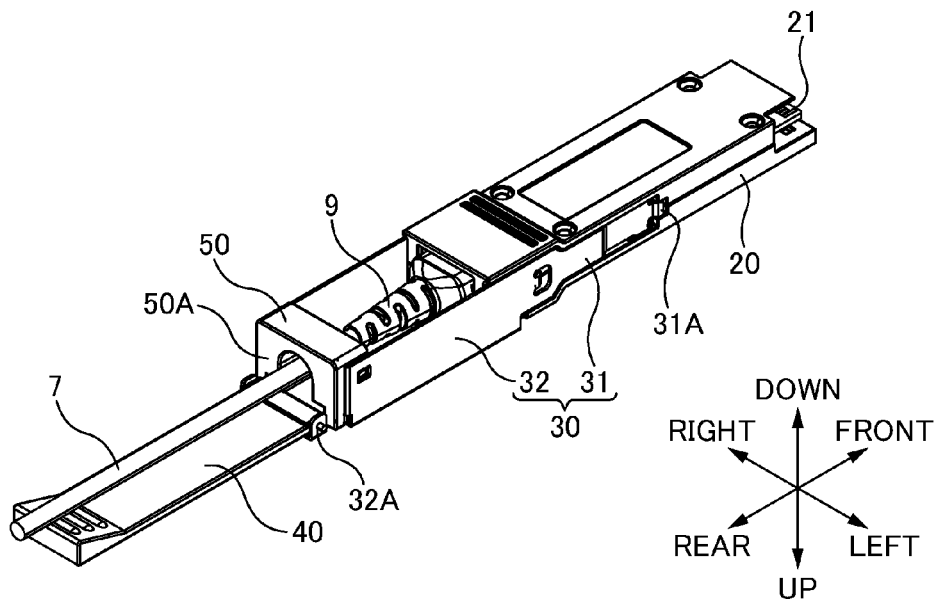
Figure 9:
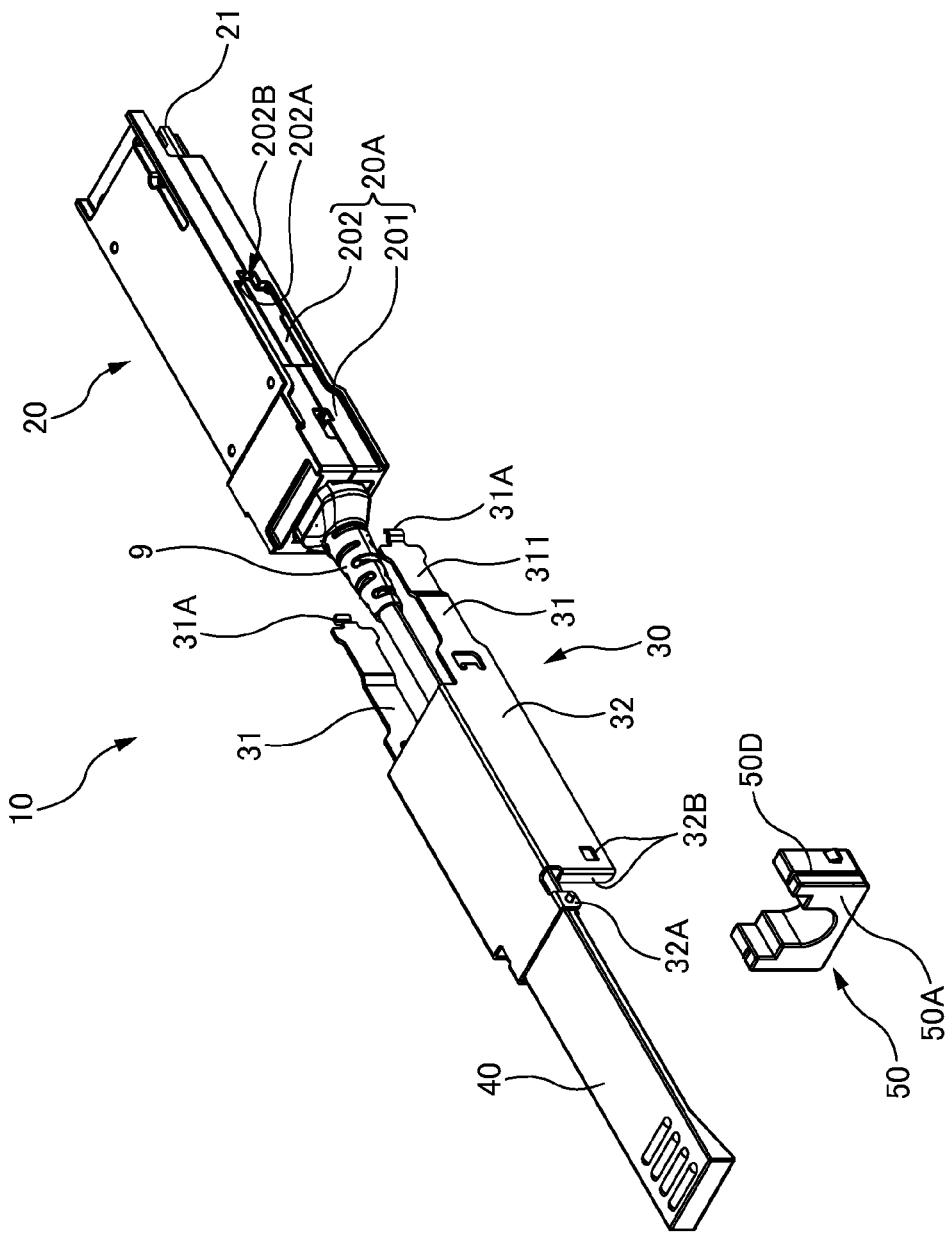
FIG. 9 is an exploded view of the optical module 10 of the second embodiment.

FIGS. 8A and 8B are diagrams illustrating an optical module 10 of a second embodiment. FIG. 9 is an exploded view of the optical module 10 of the second embodiment.

Also in the second embodiment, the optical module 10 includes a housing 20, a latch-releasing part 30, a tab 40, and a push part 50, and the rear end surface 50A of the push part 50 is located more toward the rear than the boot 9. Thus, the second embodiment also facilitates the task of inserting the optical module 10 into a cage 3 located at a far inward position.

In the optical module 10 of the second embodiment, the rotary shaft 32A for rotatably attaching the tab 40 is formed on a section projecting rearward from the U-shaped part 32. In comparison to the first embodiment wherein the rotary shaft 32A is formed on the upper surface of the U-shaped part 32, the second embodiment has no open section void of sheet metal on the upper surface of the U-shaped part 32, and thus, the U-shaped part 32 has increased strength. Note that, in the second embodiment, an operator presses a section (lower-side section) on the opposite side from the tab 40 when pressing the rear end surface 50A of the push part 50 with his/her fingertip, so the tab 40 does not get in the way, even though the rotary shaft 32A is located more toward the rear than the rear end surface 50A of the push part 50.

Further, in the optical module 10 of the second embodiment, an attachment part 32B for attaching the push part 50 is formed by inwardly folding the rear edge of each left/right lateral surface of the U-shaped part 32. Each left/right lateral surface of the push part 50 has a groove 50D formed along the up/down direction. The push part 50 is attached to the latch-releasing part 30 by inserting the attachment parts 32B of the U-shaped part 32 into the respective grooves 50D of the push part 50. Thus, when the rear end surface 50A of the push part 50 is pressed, the rear edge of the latch-releasing part 30 (i.e., the attachment parts 32B) will be pressed by the push part 50. In this way, also in the second embodiment, the push part 50 is constructed so as to press the rear edge of the latch-releasing part 30 from the rear side. Thus, the push part 50 is less likely to fall off from the latch-releasing part 30 when the push part 50 is pressed. It should be noted that the push part 50 of the second embodiment is also advantageous in that it is less likely to fall off from the latch-releasing part 30 even if it is pulled rearward.

The push part 50 of the second embodiment is a U-shaped component that is opened on the upper side. Thus, the push part 50 of the second embodiment can be attached to the latch-releasing part 30 from below. Note that, also in the second embodiment, the push part 50 has an open section, so the push part 50 can be attached even in a state where an optical cable 7 is already present. In contrast to the first embodiment, the push part 50 of the second embodiment is attached to the latch-releasing part 30 with its open section on the upper side; thus, in cases where there is more empty space on the lower side of the cage 3 (the lower side of the optical module 10) than on the upper side, an operator can easily press the rear end surface 50A of the push part 50 (the lower part of the rear end surface 50A in this example) with his/her fingertip.

Third Embodiment

In the foregoing first and second embodiments, the rear end surface 50A of the push part 50, which is attached to the latch-releasing part 30, is located more toward the rear than the boot 9, and thus, the rear end part of the latch-releasing part 30 (i.e., the rear end part of the U-shaped part 32) is also located more toward the rear than the boot 9. However, the shape of the latch-releasing part 30 is not limited to the aforementioned shape. The rear end part of the latch-releasing part 30 does not necessarily have to be located more toward the rear than the rear end of the boot 9.

Figure 10A:
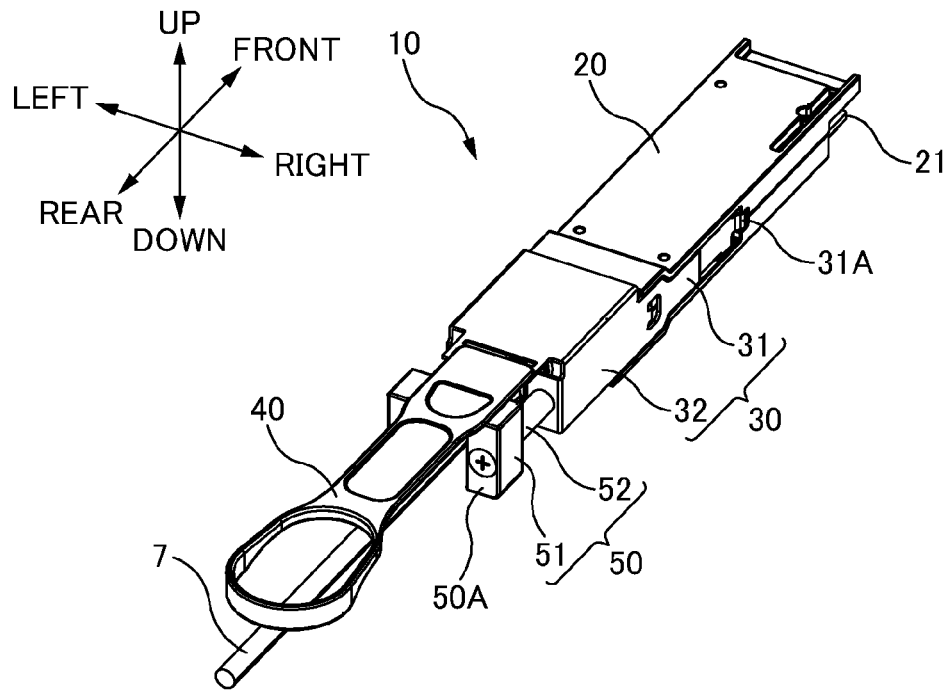
FIG. 10A is a perspective view of an optical module 10 of a third embodiment.
Figure 10B:
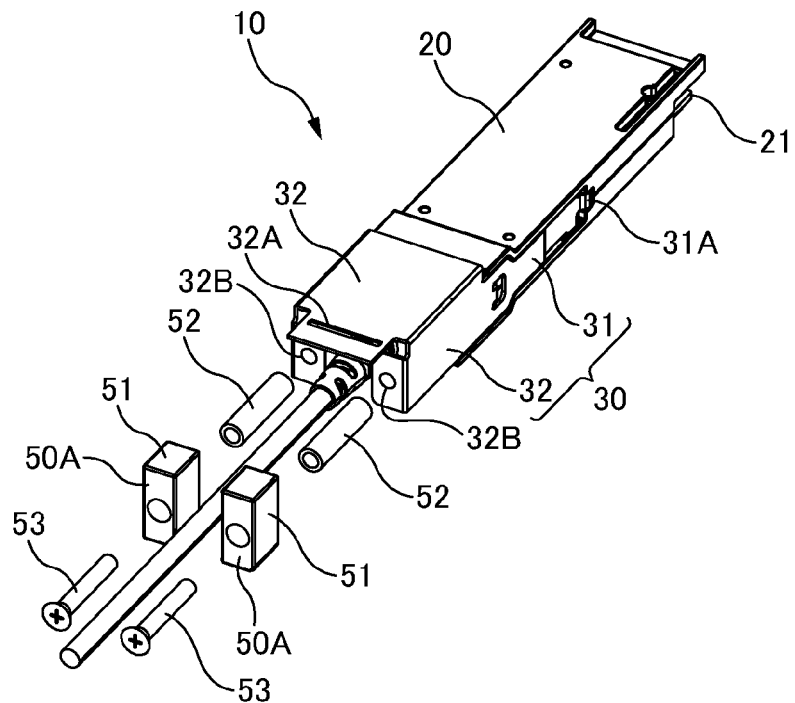
FIG. 10B is an exploded view of the optical module 10 of the third embodiment.

FIG. 10A is a perspective view of an optical module 10 of a third embodiment. FIG. 10B is an exploded view of the optical module 10 of the third embodiment. Also in the third embodiment, the optical module 10 includes a housing 20, a latch-releasing part 30, a tab 40, and a push part 50.

In the third embodiment, attachment parts 32B for attaching the push part 50 are formed by forming attachment holes in respective sections formed by inwardly folding the rear edge of the respective left/right lateral surfaces of the U-shaped part 32 of the latch-releasing part 30. In the third embodiment, the sections formed by inwardly folding the rear edge of the respective lateral surfaces of the U-shaped part 32 (i.e., the rear end parts of the latch-releasing part 30) are located more toward the front than the rear end of the boot 9. Thus, in the third embodiment, the rear end of the boot 9 projects rearward from the latch-releasing part 30.

The push part 50 includes a body part 51 and support parts 52. The body part 51 is a member to be pressed by an operator. The support parts 52 are members for fixing the body part 51 to the respective attachment parts 32B of the latch-releasing part 30. Each support part 52 has a shape extending in the front/rear direction; the front end of the support part 52 is fixed to the attachment part 32B of the latch-releasing part 30, and the rear end of the support part 52 fixes the body part 51. In this example, the body part 51 and the rear end of each support part 52 are fixed by a screw 53, but they may be fixed according to other methods.

In the third embodiment, the rear end surface 50A of the push part 50 (body part 51) is located more toward the rear than the boot 9 by interposing the support parts 52 between the latch-releasing part 30 and the body part 51. Thus, the third embodiment also facilitates the task of inserting the optical module 10 into a cage 3 located at a far inward position.

Fourth Embodiment

In the foregoing embodiments, the latch-releasing part 30 and the push part 50 are constituted by separate components. Note, however, that the latch-releasing part 30 and the push part 50 can be formed integrally.

Figure 11:
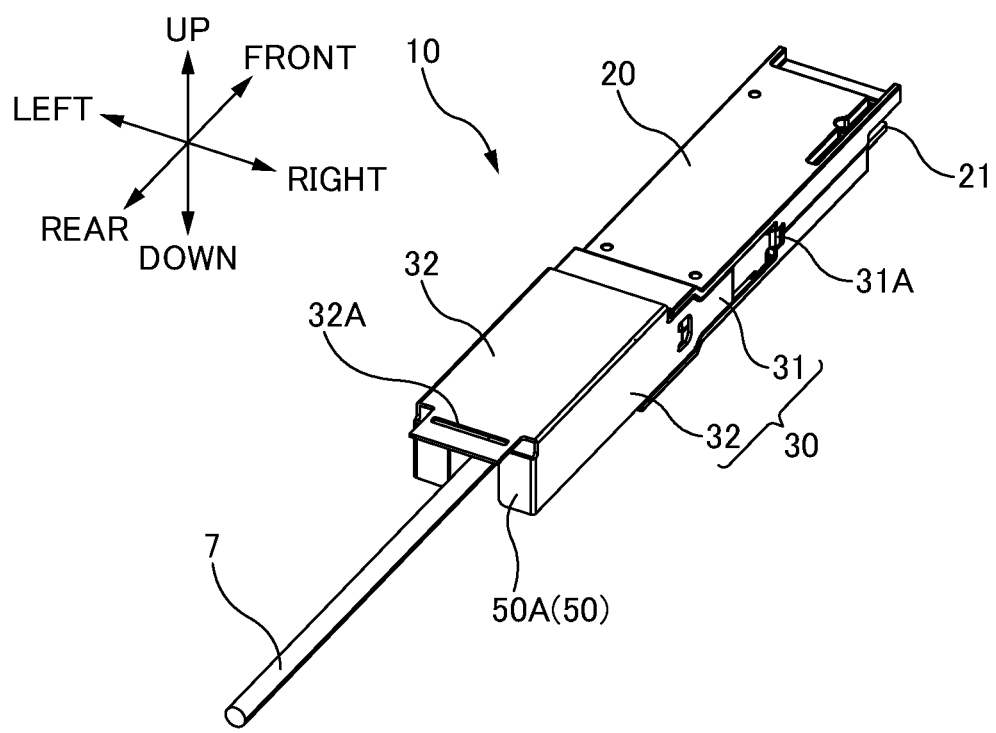
FIG. 11 is a perspective view of an optical module 10 of a fourth embodiment.

FIG. 11 is a perspective view of an optical module 10 of a fourth embodiment. Also in the fourth embodiment, the optical module 10 includes a housing 20, a latch-releasing part 30, a tab 40, and a push part 50.

In the fourth embodiment, the push part 50 is constituted by the metal sheet constituting the latch-releasing part 30. More specifically, the push part 50 is constituted by sections formed by inwardly folding the rear edge of the respective left/right lateral surfaces of the U-shaped part 32 of the latch-releasing part 30. In this way, the number of components of the optical module 10 can be reduced. In this example, however, the optical cable 7 may get damaged if the optical cable 7 contacts the push part 50. So, it is preferable to form the push part 50 as a separate component from the latch-releasing part 30 as in the first to third embodiments, and preferably make the push part 50 out of resin.

Also in the fourth embodiment, the rear end surface 50A of the push part 50 is located more toward the rear than the boot 9. Thus, the fourth embodiment also facilitates the task of inserting the optical module 10 into a cage 3 located at a far inward position.

Others

The foregoing embodiments are for facilitating the understanding of the invention, and are not to be construed as limiting the invention. The invention can be modified and improved without departing from the gist thereof, and, needless to say, the invention encompasses equivalents thereof.

Latch-Releasing Part 30:

In the foregoing embodiments, the cage 3 is made to latch onto the optical module 10 by causing the catch 3A of the cage 3 to engage with the wall part 202A of the optical module 10. Note, however, that the cage 3 may latch onto the optical module 10 by causing the projection 31A to catch against the catch 3A of the cage 3. In this case, when the optical module 10 is inserted into the cage 3, the projection 31A (latch part) catches against the catch 3A of the cage 3, to establish a latched state. Stated differently, the projection 31A (latch part) of the optical module 10 and the catch 3A of the cage 3 constitute a latch mechanism. Further, in this case, when the latch-releasing part 30 is pulled rearward, the latch-releasing part 30 slides with respect to the housing 20 and the latch part 31A of the latch-releasing part 30 disengages from the catch 3A of the cage 3, thereby releasing the latched state. As described above, the latch-releasing part 30 can serve as a member for latching the optical module 10 onto the cage 3 and also for releasing the latched state of the optical module 10.

It should be further noted that the cage 3 can latch onto the optical module 10 by causing the catch 3A of the cage 3 to catch against both the wall part 202A of the housing 20 and the projection 31A of the latch-releasing part 30, and not just one of the wall part 202A or the projection 31A. Also in this case, pulling the latch-releasing part 30 toward the rear will cause the projection 31A to release the latched state established by the catch 3A on the cage 3.

Rear End Surface 50A of Push Part 50:

In the foregoing embodiments, the push part 50 is provided to the latch-releasing part 30 by being attached to the latch-releasing part 30 or by being made out of the same metal sheet as the latch-releasing part 30. Note, however, that the push part having a rear end surface more toward the rear than the boot 9 does not necessarily have to be provided to the latch-releasing part 30.

For example, a push part having a rear end surface located more toward the rear than the boot 9 can be provided to the housing 20 by changing the shape of the rear part of the housing 20. In this case, however, the operator's pressing force will be applied directly to the housing 20, which may result in undue force being applied to the connection terminal of the optical module and/or the electric connector within the cage 3. Also, the shape of the housing will be different from the standardized shape, and thus, there will be a need to prepare a new mold for molding the housing. On the other hand, even with this configuration, the rear end surface of the push part will be located more toward the rear than the boot 9, and thus, the optical module can be inserted easily into a cage 3 arranged at a far inward position.

INDUSTRIAL APPLICABILITY

The aforementioned embodiments facilitate the task of inserting an optical module into a cage, even when the insertion opening of the cage is located at a far inward position.

REFERENCE SIGNS LIST

1: Main substrate;
3: Cage;
3A: Catch;
5: Active optical cable;
7: Optical cable;
9: Boot;
10: Optical module;
10': Optical module of reference example;
20: Housing;
20A: Guide groove;
201: Slide surface;
202: Recess;
202A: Wall part;
202B: Accommodation part;
21: Printed-circuit board;
30: Latch-releasing part;
31: Lateral surface plate;
311: Depressed part;
31A: Projection;
32: U-shaped part;
32A: Rotary shaft;
32B: Attachment part;
40: Tab;
50: Push part;
50A: Rear end surface;
50B: Step part;
50C: Protrusion;
50D: Groove;
51: Body part;
52: Support part;
53: Screw.

What is claimed is:

1. An optical module configured to be connected to an end part of man optical cable, the optical module comprising:
a housing wherein, a section of the housing on a front side thereof is configured to be inserted into a cage in an insertion direction, and a boot for protecting the optical cable extends from a rear side of the housing in a direction opposite to the insertion direction;
a latch-releasing part attached slidably in a front/rear direction to the housing, the latch-releasing part having a projection for releasing a latched state established by a catch on the cage;

a tab for pulling the latch-releasing part toward the rear to cause the projection to release the latched state established by the catch on the cage; and a push part that is to be pressed by an operator until the latched state is established, the push part having a rear end surface extending more rearwardly than the boot in a direction opposite to the insertion direction, wherein the push part is connected to the latch-releasing part, and wherein the tab is attached rotatably to a rotary shaft formed on the latch-releasing part.

2. The optical module according to claim 1, wherein the tab is made of a flexible material.

3. The optical module according to claim 1, wherein the push part is constituted by a member separate from the tab.

4. The optical module according to claim 1, wherein the rear end surface of the push part is located more rearwardly than the rotary shaft in a direction opposite to the insertion direction.

5. The optical module according to claim 1, wherein the push part comprises a section that presses a rear edge of the latch-releasing part from the rear side.

6. The optical module according to claim 1, wherein the push part is a U-shaped component comprising an open section, and is attached to the latch-releasing part by arranging the open section on an opposite side from the tab.

7. An optical-module-equipped cable comprising:

an optical cable; and an optical module connected to an end part of the optical cable, the optical module comprising:

a housing wherein, a section of the housing on a front side is configured to be inserted into a cage in an insertion direction, and a boot for protecting the optical cable extends from a rear side of the housing in a direction opposite to the insertion direction;

a latch-releasing part attached slidably in a front/rear direction to the housing, the latch-releasing part having a projection for releasing a latched state established by a catch on the cage;

a tab for pulling the latch-releasing part toward the rear to cause the projection to release the latched state established by the catch on the cage; and a push part that is to be pressed by an operator until the latched state is established, the push part having a rear end surface extending more rearwardly than the boot in a direction opposite to the insertion direction, wherein the push part is connected to the latch-releasing part, and wherein the tab is attached rotatably to a rotary shaft formed on the latch-releasing part.

\* \* \* \* \*